(12) United States Patent
Higuchi

(10) Patent No.: US 12,280,685 B2
(45) Date of Patent: Apr. 22, 2025

(54) POWER DISTRIBUTION DEVICE

(71) Applicant: DENSO CORPORATION, Kariya (JP)

(72) Inventor: Hiroaki Higuchi, Kariya (JP)

(73) Assignee: DENSO CORPORATION, Kariya (JP)

( * ) Notice: Subject to any disclaimer, the term of this patent is extended or adjusted under 35 U.S.C. 154(b) by 398 days.

(21) Appl. No.: 17/836,393

(22) Filed: Jun. 9, 2022

(65) Prior Publication Data

US 2022/0297556 A1 Sep. 22, 2022

Related U.S. Application Data

(63) Continuation of application No. PCT/JP2020/047069, filed on Dec. 17, 2020.

(30) Foreign Application Priority Data

Jan. 10, 2020 (JP) .................... 2020-003089

(51) Int. Cl.
*B60L 53/22* (2019.01)
*B60L 1/00* (2006.01)
(Continued)

(52) U.S. Cl.
CPC ............... *B60L 53/22* (2019.02); *B60L 1/00* (2013.01); *B60L 53/16* (2019.02); *H02J 7/0042* (2013.01);
(Continued)

(58) Field of Classification Search
CPC .......... B60L 53/22; B60L 53/16; B60L 53/14; B60L 53/11; B60L 53/20; B60L 53/00; B60L 1/00; B60L 2220/42; B60L 2220/40; B60L 2220/00; B60L 2210/10; B60L 2210/40; B60L 2210/00; H02J 7/00; H02J 7/0042; H02J 7/02; H02J 1/00; H02J 1/08; H02J 2207/20; H02J 2310/00; H02J 2310/40; H02J 2310/48
See application file for complete search history.

(56) References Cited

U.S. PATENT DOCUMENTS 7,201,586 B2 * 4/2007 Kohlenberg ............. H02B 1/20
439/76.1
7,597,560 B2 * 10/2009 Korich .................... H01R 9/226
439/76.2
(Continued)

FOREIGN PATENT DOCUMENTS

JP  2008-301677 A  12/2008
JP  2009-195085 A  8/2009
(Continued)

*Primary Examiner* — James M Dolak
(74) *Attorney, Agent, or Firm* — Oliff PLC

(57) ABSTRACT

A power distribution device is connected to a power source connector connected to a battery pack, a front connector connected to a front PCU that supplies power to a front MG, and a rear connector connected to a rear PCU that supplies power to a rear MG. Further, the power distribution device has a DC power connector which may be connected to an external DC power source and an AC power connector which may be connected to an external AC power source. The power source connector, the front connector, and the rear connector are provided on an inner side of the vehicle than the DC power connector and the AC power connector.

4 Claims, 6 Drawing Sheets

(51) Int. Cl.
*B60L 53/16* (2019.01)
*H02J 7/00* (2006.01)
*H02J 7/02* (2016.01)

(52) U.S. Cl.
CPC ............ *H02J 7/02* (2013.01); *H02J 2207/20* (2020.01); *H02J 2310/48* (2020.01)

(56) References Cited

U.S. PATENT DOCUMENTS

| | | | | |
|---|---|---|---|---|
| 7,686,623 | B2* | 3/2010 | Honda | H05K 5/0039 |
| | | | | 439/78 |
| 9,035,487 | B2* | 5/2015 | Tomokage | B60K 1/00 |
| | | | | 307/9.1 |
| 9,042,147 | B2* | 5/2015 | Ishii | H02M 1/12 |
| | | | | 361/677 |
| 9,066,453 | B2* | 6/2015 | Wagner | H05K 1/0203 |
| 9,184,640 | B2* | 11/2015 | Morimoto | H02K 11/33 |
| 9,260,017 | B2* | 2/2016 | Shiba | B60L 50/00 |
| 9,312,782 | B2* | 4/2016 | Tachibana | H05K 7/14329 |
| 9,469,205 | B2* | 10/2016 | Kwon | B60L 53/14 |
| 9,543,551 | B2* | 1/2017 | Tanaka | H01M 50/271 |
| 10,052,942 | B2* | 8/2018 | Okuda | B60L 3/0007 |
| 10,381,922 | B2* | 8/2019 | Okazaki | B60L 53/20 |
| 10,798,835 | B2* | 10/2020 | Takeda | H05K 5/0069 |
| 10,882,474 | B2* | 1/2021 | Young | H01G 4/40 |
| 11,491,933 | B2* | 11/2022 | Zeng | B60L 53/22 |
| 11,553,617 | B2* | 1/2023 | Kosaka | H05K 7/1432 |
| 12,069,814 | B2* | 8/2024 | Sumida | H05K 5/0039 |
| 12,154,739 | B2* | 11/2024 | Nishimata | H01H 45/12 |
| 12,155,141 | B2* | 11/2024 | Baumann | H01R 13/005 |
| 2017/0355272 | A1* | 12/2017 | Baba | H02P 27/06 |
| 2018/0301983 | A1 | 10/2018 | Okazaki et al. | |
| 2021/0213897 | A1 | 7/2021 | Kamiya | |

FOREIGN PATENT DOCUMENTS

| | | |
|---|---|---|
| JP | 2014-043124 A | 3/2014 |
| JP | 2015-074435 A | 4/2015 |
| JP | 2015-101134 A | 6/2015 |

* cited by examiner

POWER DISTRIBUTION DEVICE

CROSS REFERENCE TO RELATED APPLICATION

The present application is a continuation application of International Patent Application No. PCT/JP2020/047069 filed on Dec. 17, 2020, which designated the U.S. and claims the benefit of priority from Japanese Patent Application No. 2020-003089 filed on Jan. 10, 2020, the entire contents of which are incorporated herein by reference.

TECHNICAL FIELD

Disclosure herein relates to a power distribution device comprising a plurality of connectors.

BACKGROUND

A power distribution device connected between a battery and a motor includes connectors on a housing for the device. The power distribution device is required to perform minimum function even after an accident. But, even if it was a small accident the power distribution device is subject to an application of external force.

SUMMARY

In the above aspects, or in other aspects not mentioned, there is a need for further improvements in a power distribution device.

A power distribution device according to an aspect of the present disclosure comprises:
an external power connector which is capable of being connected to an external power source;
an internal power connector which is capable of being connected to a vehicle-mounted power source; and
a power connector which is capable of being connected to a vehicle-mounted power transformer circuit supplying power to a vehicle-mounted electrical device, wherein
the internal power connector and the power connector are provided on an inner side of the vehicle than the external power connector.

According to this, it is possible to suppress an occurring of failures of the internal power connector and the power connector caused by an external force application to the vehicle. Therefore, it is possible to suppress an occurring of failures of power supply from the vehicle-mounted power source to the vehicle-mounted power transformer unit. As a result, it is possible to suppress an occurring of failures of power supply to the vehicle-mounted power transformer unit.

DESCRIPTION OF EMBODIMENT

Figure 1:
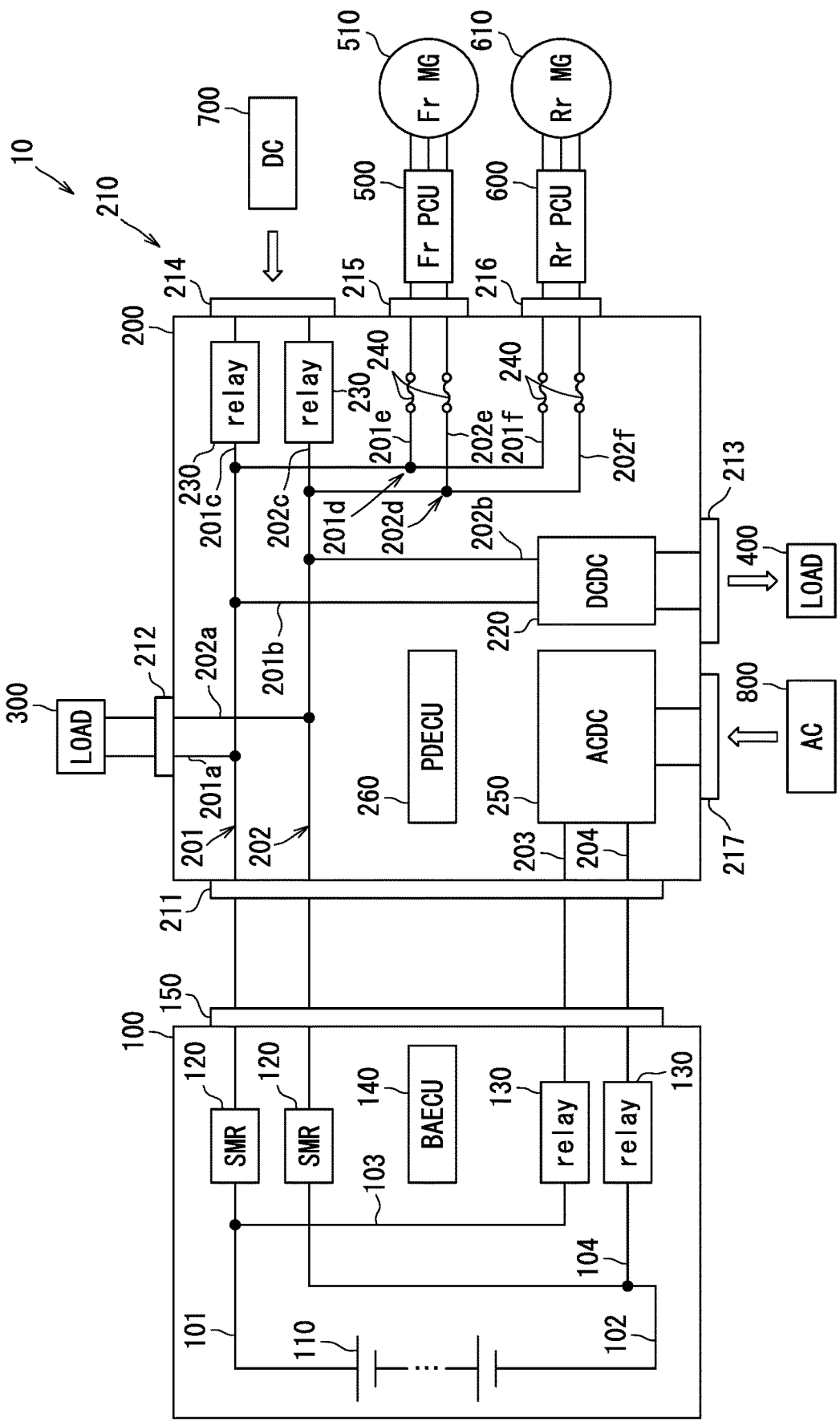
FIG. 1 is a circuit diagram for explaining a power supply system.

The following will describe embodiments for carrying out the present disclosure with reference to the drawings. In each embodiment, parts corresponding to the elements described in the preceding embodiments are denoted by the same reference numerals, and redundant explanation may be omitted. When only a part of the configuration is described in each form, the other forms described above can be applied to the other parts of the configuration.

JP5936745B discloses a power transformer device which includes a battery-side connector, a capacitor module, and a power module. A battery is connected to the battery-side connector. The battery-side connector and the capacitor module are connected via first bus bars. The capacitor module and the power module are connected via second bus bars. Motor side bus bars are connected to the power module. A motor generator is connected to the motor side bus bars.

As described in JP5936745B, the battery and the motor generator are connected via the power transformer device. If an abnormality occurs in a path for electrically connecting the battery and the motor generator in the power transformer device, there may be a failure of a power supply to the motor generator. It is an object of the present disclosure to provide a power distribution device in which a failure of a power supply is suppressed.

When, in each embodiment, it is specifically described that combination of parts is possible, the parts can be combined. In a case where any obstacle does not especially occur in combining the parts of the respective embodiments, it is possible to partially combine the embodiments, the embodiment and the modification, or the modifications even when it is not explicitly described that combination is possible.

First Embodiment

A power distribution device according to a present embodiment is described with reference to FIGS. 1 to 3. The power distribution device is applied to an electric vehicle such as a full electric powered vehicle and a plug-in hybrid vehicle. In this embodiment, a configuration in which the power distribution device is applied to an electric vehicle is described as an example.

<Power Supply System>

As shown in FIG. 1, the power distribution device 200 is included in a vehicle power supply system 10. In addition to the power distribution device 200, the power supply system 10 includes a plurality of components. The power supply system 10 includes a battery pack 100, a first vehicle load 300 (LOAD), a second vehicle load 400 (LOAD), a front PCU 500 (Fr PCU), a front MG 510 (Fr MG), a rear PCU 600 (Rr PCU), and a rear MG 610 (Rr MG). Further, the power supply system 10 includes a vehicle-mounted ECU and a vehicle-mounted sensor (not shown). The power supply system 10 is capable of being connected to at least one external power source such as a DC power source 700 (DC) and/or an AC power source 800 (AC). PCU is an abbreviation for Power Control Unit. MG is an abbreviation of a motor generator. In the drawing, the DC power source 700 is referred to as DC. The AC power source 800 is referred to as AC.

The battery pack 100 and the power distribution device 200 are electrically connected to each other in the vehicle via a wire harness or the like, which is provided as a power supply path. The first vehicle load 300 and the second vehicle load 400 are electrically connected to the power distribution device 200 via a wire harness or the like. Further, the front PCU 500 and the rear PCU 600 are electrically connected to the power distribution device 200 via a wire harness or the like. The front MG 510 is electrically connected to the front PCU 500. The rear MG 610 is electrically connected to the rear PCU 600.

Due to the electrical connection configuration described above, a DC power output from the battery pack 100 is supplied to the first vehicle load 300 and the second vehicle load 400 via the power distribution device 200. Further, this DC electric power is supplied to the front PCU 500 and the rear PCU 600. The battery pack 100 corresponds to a vehicle-mounted power source.

Each of the front PCU 500 and the rear PCU 600 includes an inverter circuit and/or a converter circuit for performing power transformation. Each of the front PCU 500 and the rear PCU 600 converts a supplied DC electric power into an AC electric power. On the contrary, each of the front PCU 500 and the rear PCU 600 converts a supplied AC electric power into a DC electric power. Each of the front PCU 500 and the rear PCU 600 corresponds to a vehicle-mounted power transformer circuit.

The front MG 510 and the rear MG 610 are motor generators for traveling the vehicle to make the vehicle running. The front MG 510 is powered by the AC electric power supplied from the front PCU 500. The rear MG 610 is powered by the AC electric power supplied from the rear PCU 600. The front MG 510 generates power to rotate a front wheel of the vehicle. The rear MG 610 generates power to rotate a rear wheel of the vehicle. The front MG 510 and the rear MG 610 correspond to vehicle-mounted electrical devices (motors), respectively.

The front MG 510 and the rear MG 610 performs regenerative generation of electricity by receiving a propulsive force of the vehicle. The AC electric power generated by this regenerative power generation is converted into a DC electric power by the front PCU 500 and the rear PCU 600. The DC power is supplied to the first vehicle load 300 and the second vehicle load 400 via the power distribution device 200. Further, the DC power is supplied to the battery pack 100 via the power distribution device 200.

Hereinafter for convenience, the DC electric power supplied from the battery pack 100 is referred to as a vehicle-mounted power. The electric power generated by the regenerative power generation and converted into the DC electric power by the front PCU 500 and the rear PCU 600 is referred to as a regenerative electric power.

The first vehicle load 300 may be, for example, a heater mounted on the vehicle, an air-conditioning device, and an external load, which is capable of being connected to an outlet of the vehicle. The power from the power source and the regenerative power are supplied to the first vehicle load 300 via the power distribution device 200. Further, as is described later, in the case that a power source from an outside is connected to the power distribution device 200, a charging electric power is supplied to the first vehicle load 300.

As shown in FIG. 1, the power distribution device 200 includes a DCDC converter circuit 220. The DCDC converter circuit 220 is supplied with the vehicle-mounted power, the regenerative electric power, and the charging electric power. The DCDC converter circuit 220 steps down supplied electric power to 12V and supplies it to the second vehicle load 400. The second vehicle 400 is, for example, a speaker, a power window, a power steering device, and the like.

The DC power source 700 from the outside may be connected to the power distribution device 200. A DC charging electric power output from the DC power source 700 is supplied to the battery pack 100, the first vehicle load 300, and the DCDC converter circuit 220. As a result, the battery pack 100 is charged. The charging electric power is supplied to the first vehicle load 300, and 12V DC electric power is supplied from the DCDC converter circuit 220 to the second vehicle load 400.

The power distribution device 200 includes an ACDC inverter circuit 250. The AC power source 800 may be connected to the ACDC inverter circuit 250 from the outside. The ACDC inverter circuit 250 converts the AC electric power supplied from the AC power source 800 into the DC electric power. This DC electric power is supplied to the battery pack 100 as a charging electric power. As a result, the battery pack 100 is charged. The charging electric power is also supplied to the first vehicle load 300 and the DCDC converter circuit 220 by controlling a system power relays 120 described later. Each of the DC power source 700 and the AC power source 800 corresponds to the external power source. The DCDC inverter circuit 220 and the ACDC inverter circuit 250 correspond to a power transformer circuit.

As described above, the power distribution device 200 performs a function of supplying the electric power from both the power outputted in the vehicle and the regenerative power to various electric devices mounted on the vehicle. The power distribution device 200 performs a function of supplying charging power supplied from an external power source to various electric devices mounted on the vehicle. Hereinafter, components included in the battery pack 100 and the power distribution device 200 are described.

<Battery Pack>

The battery pack 100 includes an assembled battery 110, system main relays 120 (SMR), power relays 130 (relays), a battery ECU 140 (BTECU), and a battery connector 150. The battery ECU 140 controls each of operation of the SMRs 120 and the power relays 130. An output of the assembled battery 110 to the battery connector 150 side is controlled to be connected and disconnected by driving the SMRs 120 and the power relays 130. In the drawing, the battery ECU 140 is referred to as BAECU.

The assembled battery 110 has a plurality of battery cells connected in series. A voltage corresponding to a potential difference between a positive terminal of the battery cell having the highest potential and a negative terminal of the battery cell having the lowest potential among the plurality of battery cells connected in series corresponds to a power source voltage of the assembled battery 110. As the battery cell included in the assembled battery 110, a secondary battery such as a lithium ion battery can be adopted.

One end of a first power line 101 is connected to a positive terminal of the battery cell located at the highest potential among the plurality of battery cells connected in series. One end of a second power line 102 is connected to a negative terminal of the battery cell located at the lowest potential. The other ends of the first power line 101 and the second power line 102 are provided in and connected to the battery connector 150.

The power relays 130 are provided in the third power line 103 and the fourth power line 104, respectively. The SMRs 120 are mechanical switch elements. The SMRs 120 are normally close type switch elements that are turned off by inputting drive signals from the battery ECU 140 and turned on by interrupting the drive signals. The SMR is an abbreviation for System Main Relay.

One end of the third power line 103 is connected to an intermediate point between the assembled battery 110 and the SMR 120 in the first power line 101. One end of the fourth power line 104 is connected to an intermediate point between the assembled battery 110 and the SMR 120 in the second power line 102. The other ends of the third power line 103 and the fourth power line 104 are provided in and connected to the battery connector 150.

The power relays 130 are provided in the third power line 103 and the fourth power line 104, respectively. The power relays 130 are mechanical switch elements. The power relays 130 are normally open type switch elements that are turned on by inputting drive signals from the battery ECU 140 and turned off by interrupting the drive signals.

The battery ECU 140 performs communication with the other vehicle-mounted ECUs and the power distribution ECU 260 described later via wiring (not shown). The battery ECU 140 controls operation of the SMRs 120 and the power relays 130 based on vehicle signals including vehicle information input from communication with these ECUs and vehicle-mounted sensors.

As described above, the battery connector 150 is provided with the other ends of the first to fourth power lines 101 to 104. Control of electrical connections and disconnections to the assembled battery 110, which is located on the other ends side of these four power lines, is performed by outputting the drive signal or non-outputting the drive signal from the battery ECU 140 to both the SMRs 120 and the power relays 130. The other ends of these four power lines are connected to the power distribution device 200.

<Power Distribution Device>

The power distribution device 200 includes a distribution connector 210, a DCDC converter circuit 220 (DCDC), DC relays 230 (relay), fuses 240, an ACDC inverter circuit 250 (ACDC), and a power distribution ECU 260 (PDECU). In the drawings, the ACDC inverter circuit 250 is referred to as ACDC. The power distribution ECU 260 is shown by PDECU.

The distribution connector 210 includes a power source connector 211, a first load connector 212, a second load connector 213, a DC power connector 214, a front connector 215, a rear connector 216, and an AC power connector 217.

The power source connector 211 corresponds to the internal power connector. The DC power connector 214 and the AC power connector 217 correspond to the external power connector. The front connector 215 and the rear connector 216 correspond to the power connector.

The power source connector 211 is provided with one ends of the first to fourth power lines 201 to 204. The battery connector 150 of the battery pack 100 is capable of being connected to the power source connector 211.

One end of the first power line 201 is capable of being connected and disconnected to the other end of the first power line 101 at the battery connector 150 and the power connector 211. One end of the second power line 202 is capable of being connected and disconnected to the other end of the second power line 102 at the battery connector 150 and the power connector 211. As a result, when the SMRs 120 of the assembled battery 110 are turned off, both the first power line 201 and the second power line 202 are electrically connected to the assembled battery 110. Contrary, when the SMRs 120 are turned off, the electrical connections between the assembled battery 110 and both the first power line 201 and the second power line 202 are disconnected.

The first power line 201 is branched from a first main wiring into a plurality of positive lines. Similarly, the second power line 202 is branched from a second main wiring into a plurality of negative lines.

Distal ends of the plurality of positive electrode lines and the negative electrode lines are provided on the first load connector 212 to the rear connector 216 as the other ends of the first power line 201 and the second power line 202, respectively. The DCDC converter circuit 220, the DC relays 230, and the fuses 240 are provided on the positive line and the negative line. The positive line and the negative line are described in detail later.

One end of the third power line 203 is capable of being connected and disconnected to the other end of the third power line 103 at the battery connector 150 and the power connector 211. One end of the fourth power line 204 is capable of being connected and disconnected to the other end of the fourth power line 104 at the battery connector 150 and the power connector 211. As a result, when the power relays 130 of the assembled battery 110 are turned on, the third power line 203 and the fourth power line 204 are electrically connected to the assembled battery 110. When the power relays 130 are turned off, the electrical connections between the assembled battery 110 and both the third power line 203 and the fourth power line 204 are disconnected.

The ACDC inverter circuit 250 is provided on the third power line 203 and the fourth power line 204. A pair of the other ends of the third power line 203 and the fourth power line 204 is provided in the AC power connector 217. The AC power source 800 may be connected to the AC power connector 217 from the outside. As a result, when the power relays 130 are turned on, the assembled battery 110 and the AC power source 800 are electrically connected via the ACDC inverter circuit 250.

The power distribution ECU 260 performs communication with the vehicle-mounted ECUs and the battery ECU 140 via wiring (not shown). The power distribution ECU 260 controls operations of the DCDC converter circuit 220, the DC relays 230, and the ACDC inverter circuit 250 based on vehicle signals including vehicle information input from communication with these ECUs and vehicle-mounted sensors not shown. The power distribution ECU 260 corresponds to a control unit.

As described above, the DC power source 700 and the AC power source 800 may be connected to the power distribution device 200 as external power sources. In the case that these external power sources are, for example, an electric power charging station, the power distribution ECU 260 communicates with a control unit disposed in the electric power charging station. The power distribution ECU 260 outputs this communication result to the vehicle-mounted ECUs and the battery ECU 140. The power distribution ECU 260 controls operation of the DCDC converter circuit 220, the DC relays 230, and the ACDC inverter circuit 250 based on the communication result and the vehicle information. Similarly, the battery ECU 140 controls operation of the SMRs 120 and the power relays 130 based on the communication result and the vehicle information.

<Positive Line and Negative Line>

As shown in FIG. 1, the first power line 201 is branched from the first main wiring into four lines including: a first positive line 201a; a second positive line 201b; a third positive line 201c; and a fourth positive line 201d. The second power line 202 is branched from the second main wiring into four lines including: a first negative line 202a; a second negative line 202b; a third negative line 202c; and a fourth negative line 202d.

A pair of the distal ends of the first positive line 201a and the first negative line 202a is provided in the first load connector 212. As a result, when the SMRs 120 are turned on, the assembled battery 110 and the first vehicle load 300 are electrically connected.

A pair of the distal ends of the second positive line 201b and the second negative line 202b is provided in the second load connector 213. The DCDC converter circuit 220 is provided on the second positive line 201b and the second negative line 202b. As a result, when the electric power is supplied to the DCDC converter circuit 220, 12V DC electric power is supplied to the second vehicle load 400.

A pair of the distal ends of the third positive line 201c and the third negative line 202c is provided in the DC power connector 214. The DC relays 230 are provided on the third positive line 201c and the third negative line 202c, respectively. As a result, when the DC relays 230 are turned on, the first vehicle load 300 and the DCDC converter circuit 220 are electrically connected to the DC power source 700. Further, when the SMRs 120 are turned on, the assembled battery 110 is electrically connected to the DC power source 700.

The DC relays 230 are mechanical switch elements. The DC relays 230 are normally open type switch elements which are turned on by inputting drive signals from the power distribution ECU 260 and turned off by interrupting the drive signals. The DC relays 230 correspond to switch elements.

The fourth positive line 201d is branched into two, a positive front line 201e and a positive rear line 201f. The fourth negative line 202d is branched into two, a negative front line 202e and a negative rear line 202f. The fuses 240 are provided on these four lines, respectively.

A pair of the distal ends of the positive front line 201e and the negative front line 202e is provided in the front connector 215. The front PCU 500 is connected to the front connector 215. As a result, the first vehicle load 300 and the DCDC converter circuit 220 are each electrically connected to the front PCU 500. When the SMRs 120 are turned on, the assembled battery 110 and the front PCU 500 are electrically connected.

A pair of the distal ends of the positive rear line 201f and the negative rear line 202f is provided in the rear connector 216. The rear PCU 600 is connected to the rear connector 216. As a result, the first vehicle load 300 and the DCDC converter circuit 220 are each electrically connected to the rear PCU 600. When the SMRs 120 are turned on, the assembled battery 110 and the rear PCU 600 are electrically connected.

<Operation of Power Supply System>

The operation of the power supply system 10 is described below.

The battery ECU 140 turns on the SMRs 120 at a normal condition which includes such as a parked or stopped condition of the vehicle or a normal running condition of the vehicle. Further, the battery ECU 140 turns off the power relays 130. The power distribution ECU 260 turns off the DC relays 230.

As a result, the electric power of the assembled battery 110 is supplied to the first vehicle load 300, the DCDC converter circuit 220, the front PCU 500, and the rear PCU 600. Contrary, the regenerative electric power of the front MG 510 and the rear MG 610 are supplied to the first vehicle load 300, the DCDC converter circuit 220, and the assembled battery 110.

In the DC charging condition, in which the DC power source 700 is connected to the power distribution device 200 in a parked or stopped condition, the battery ECU 140 turns on the SMRs 120. Further, the battery ECU 140 turns off the power relays 130. The power distribution ECU 260 turns on the DC relays 230.

As a result, the DC electric power supplied from the DC power source 700 is supplied to the assembled battery 110, the first vehicle load 300, and the DCDC converter circuit 220. An amount of electric power supplied to the first vehicle load 300 is determined according to a required power of the first vehicle load 300.

In the AC charging condition, in which the AC power source 800 is connected to the power distribution device 200 in a parked or stopped condition, the battery ECU 140 turns on the SMRs 120 and the power relays 130, respectively. The power distribution ECU 260 turns off the DC relays 230.

As a result, the AC electric power supplied from the AC power source 800 is converted into the DC electric power by the ACDC inverter circuit 250. This DC electric power is supplied to the assembled battery 110, the first vehicle load 300, and the DCDC converter circuit 220. An amount of electric power supplied to the first vehicle load 300 is determined according to a required power of the first vehicle load 300.

<Vehicle-Mounted State>

Figure 10:
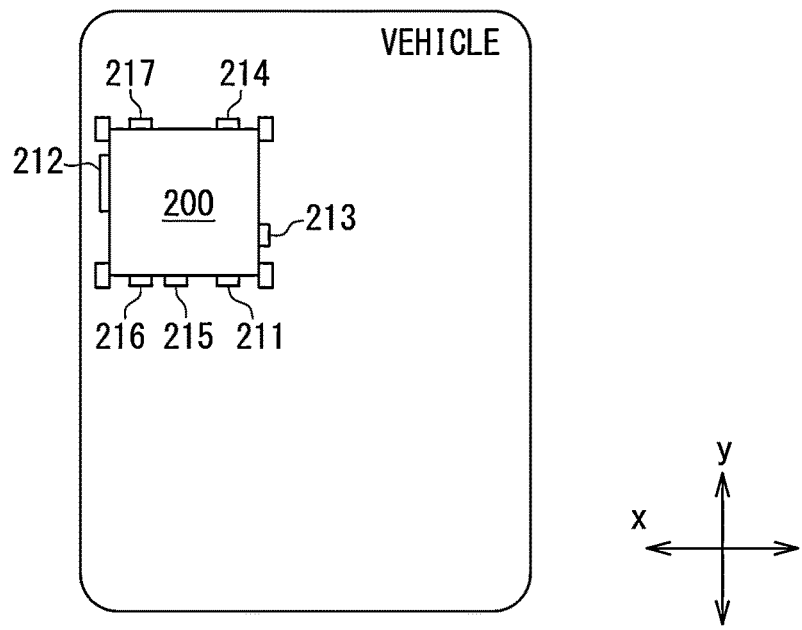
FIG. 10 is a schematic diagram for explaining a position of connectors of the power distribution device mounted in the vehicle.

Next, a vehicle-mounted state of the power distribution device 200 is described with reference to FIGS. 2, 3, and 10. In FIGS. 2, 3, and 10, the DCDC converter circuit 220, the DC relays 230, the fuses 240, the ACDC inverter circuit 250, and the power distribution ECU 260 are not shown. Further, FIG. 2 illustrates only a portion of the power line related to the electrical connection path between the battery pack 100 and the PCU. In FIG. 3, the power line is not shown, and the power source connector 211 and the DC power connector 214 are shown as representatives of the distribution connector 210. In FIG. 10, the power distribution device 210 is shown within the vehicle.

In the following, the three directions orthogonal to each other are referred to as a "x" direction, a "y" direction, and a "z" direction. One of the "x" direction and the "y" direction corresponds to a left and right direction of the vehicle, and the other one corresponds to a forward and reverse direction of the vehicle. The "z" direction corresponds to a top and bottom direction of the vehicle.

Figure 3:
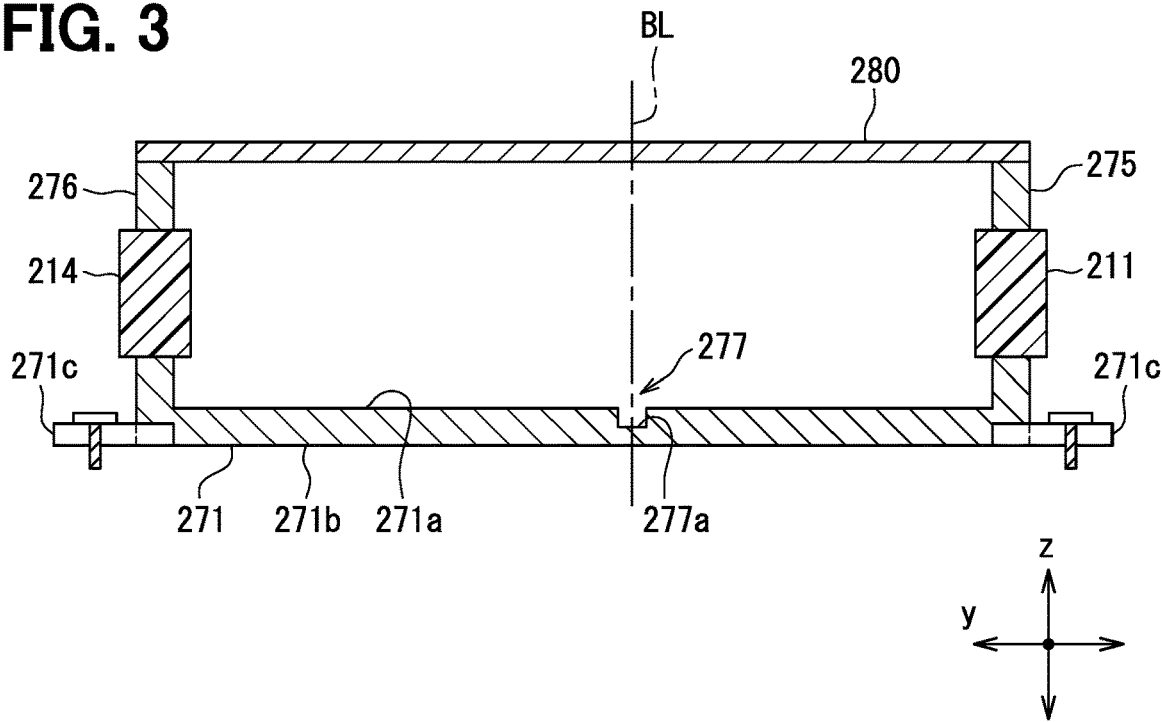
FIG. 3 is a cross-sectional view for explaining an irregular-shaped portion.

In addition to the electric devices described so far, the power distribution device 200 includes a housing 270 shown in FIG. 3 and a lid member which closes an opening of the housing 270. The housing 270 has a bottom wall 271 having a thin thickness in the "z" direction, and a side wall 272 which rises in an annular shape in the "z" direction from the inner bottom surface 271a of the bottom wall 271.

An outer bottom surface 271b on a back side of the inner bottom surface 271a is provided on a side to an underbody side of the vehicle in the "z" direction than the inner bottom surface 271a. A flange portion 271c for fixing the power distribution device 200 on an underbody portion by using a bolt is integrally connected to the bottom wall 271 providing the outer bottom surface 271*b*.

<Inner Wall and Outer Wall>

Figure 2:
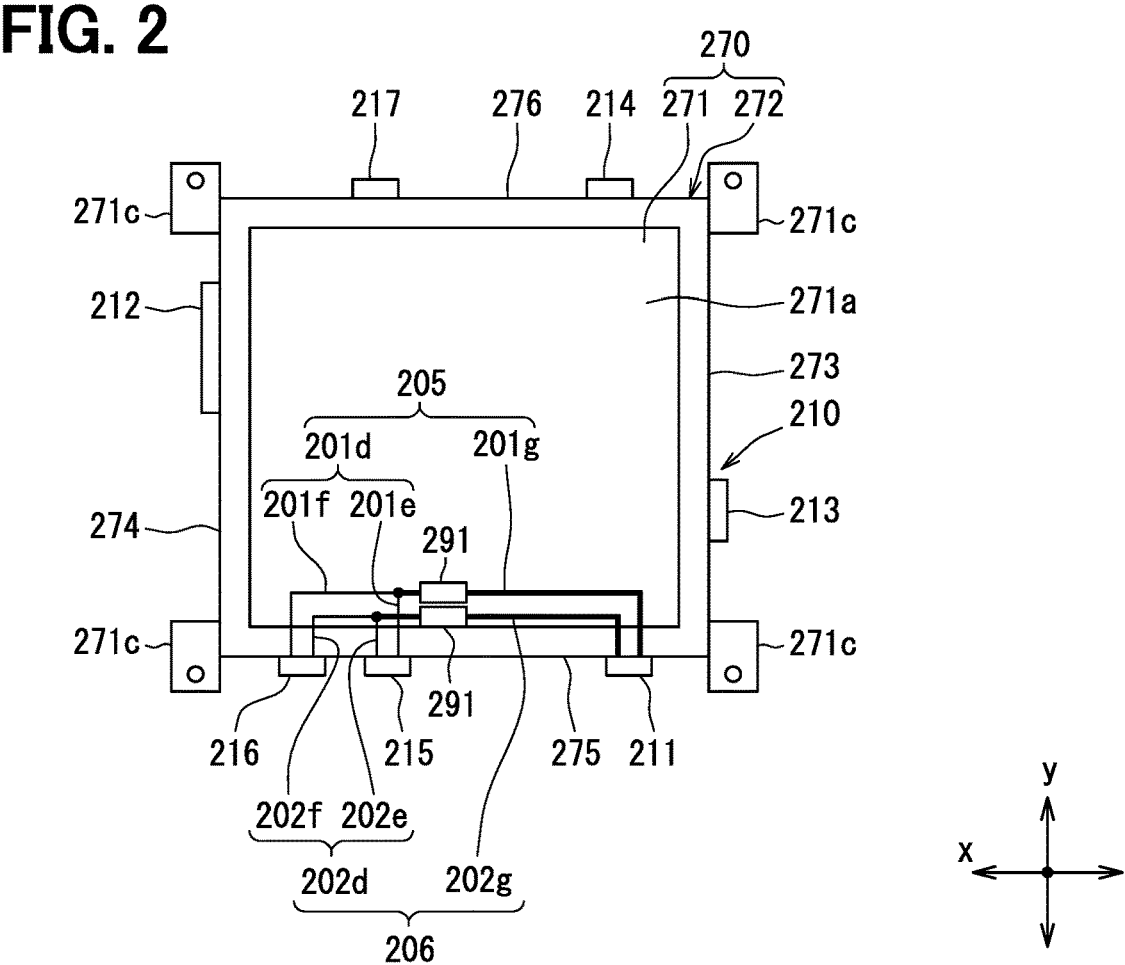
FIG. 2 is a schematic diagram for explaining a position of connectors of a power distribution device mounted in the vehicle.

As shown in FIG. 2, the side wall 272 includes an inner horizontal wall 273 and an outer horizontal wall 274, which are arranged apart from each other in the "x" direction, and an inner vertical wall 275 and an outer vertical wall 276, which are arranged apart from each other in the "y" direction. The side wall 272 forms an annular shape by connecting these four walls in a circumferential direction about the "z" direction. In FIG. 2, the illustration of the lid 280 is omitted in order to explain these four walls.

These four walls are arranged on an inner side and an outer side of the vehicle in a mounted state to the vehicle. In the "x" direction, the inner horizontal wall 273 is arranged on an inner side of the vehicle rather than the outer horizontal wall 274. In the "y" direction, the inner vertical wall 275 is arranged on an inner side of the vehicle rather than the outer vertical wall 276.

<Connector Arrangement>

Those four walls of the side wall 272 are formed with notches, apertures, and the like to provide the distribution connectors 210. Among the four walls, the power source connector 211, the front connector 215, and the rear connector 216 are provided on a side to the inner horizontal wall 273 or the inner vertical wall 275 which are relatively arranged on an inner side of the vehicle. The DC power connector 214 and the AC power connector 217 are provided on a side to the outer horizontal wall 274 or the outer vertical wall 276 which are relatively arranged on an outer side of the vehicle. The first load connector 212 and the second load connector 213 may be provided on any of these four walls.

According to the configuration described above, the power source connector 211, the front connector 215, and the rear connector 216 are provided on an inner side of the vehicle than the DC power connector 214 and the AC power connector 217, respectively. As described above, the connector, which are used during running the vehicle, are provided on an inner side of the vehicle than the connector, which are used during supplying power from the external power source.

As specifically shown in FIGS. 2 and 10, in the present embodiment, a power source connector 211, a front connector 215, and a rear connector 216 are provided on the inner vertical wall 275. On the inner vertical wall 275, the power source connector 211, the front connector 215, and the rear connector 216 are arranged next to each other in the "x" direction.

The DC power connector 214 and the AC power connector 217 are provided on the outer vertical wall 276. The second load connector 213 is provided on the inner horizontal wall 273. The first load connector 212 is provided on the outer horizontal wall 274.

The second load connector 213 functions to supply 12V DC power to the vehicle-mounted devices involved in a vehicle running function. Therefore, it is preferable that the second load connector 213 is arranged on an inner side of the vehicle rather than the DC power connector 214 and the AC power connector 217. In the present embodiment, the second load connector 213 is provided on a side to the inner vertical wall 275 of the inner horizontal wall 273 in the "y" direction.

<Arrangement of Electrical Components>

Electrical devices accommodated in the housing 270 may be classified into a first device, which is used during running the vehicle, and a second device, which is used during supplying power from the external power source. The first device is arranged in an inner side of the vehicle rather than the second device.

The first device includes the DCDC converter circuit 220, the fuses 240, and the power distribution ECU 260. The second device includes the DC relays 230 and the ACDC inverter circuit 250. The power distribution ECU 260 is used both during running and during external power supplying, but is one of the first device because it is related to drive control during running. However, it is also possible to adopt a configuration in which at least a part of the first device is provided on an outer side of the vehicle than the second device.

<Power Supply Line>

In the following description, in order to simplify references, a part connecting the power source connector 211 and the front connector 215 and a part connecting the power source connector 211 and the rear connector 216 are collectively referred to as a first power supply line 205 in the first power line 201. A part connecting the power source connector 211 and the front connector 215 and a part connecting the power source connector 211 and the rear connector 216 are collectively referred to as a second power supply line 206 in the second power line 201.

FIG. 2 briefly shows the first power supply line 205 and the second power supply line 206. A pair of one ends of the first power supply line 205 and the second power supply line 206 is provided in the power source connector 211. A pair of the other ends of the first power supply line 205 and the second power supply line 206 provided in the front connector 215 and the rear connector 216.

The first power supply line 205 and the second power supply line 206 are provided on an inner side of the vehicle than the DC power connector 214 and the AC power connector 217, which are used during supplying power from the external power source. In the present embodiment, the first power supply line 205 and the second power supply line 206 are provided on a side to the inner vertical wall 275 in the "y" direction.

The first power supply line 205 includes the positive common line 201*g* and the above-mentioned fourth positive line 201*d*. The positive common line 201*g* is included in the first main wiring described above. The fourth positive line 201*d* has the above-mentioned positive front line 201*e* and the positive rear line 201*f*.

One end of the positive common line 201*g* corresponds to one end of the first power supply line 205, and is provided in the power source connector 211. One end of the positive front line 201*e* and one end of the positive rear line 201*f* are connected to the other end of the positive common line 201*g*. The other end of the positive common line 201*g* is a first branch point that branches into these two positive lines.

The other ends of the positive front line 201*e* and the positive rear line 201*f* correspond to the other ends of the first power supply line 205. The other end of the positive front line 201*e* is provided in the front connector 215. The other end of the positive rear line 201*f* is provided in the rear connector 216.

The second power supply line 206 includes the negative common line 202*g* and the above-mentioned fourth negative line 202*d*. The negative common line 202*g* is included in the second main wiring described above. The fourth negative line 202*d* has the above-mentioned negative front line 202*e* and the negative rear line 202*f*.

One end of the negative common line 202*g* corresponds to one end of the second power supply line 206, and is provided in the power source connector 211. One end of the negative front line 202e and one end of the negative rear line 202f are connected to the other end of the negative common line 202g. The other end of the negative common line 202g is a second branch point that branches into these two negative lines.

The other ends of the negative front line 202e and the negative rear line 202f correspond to the other ends of the second power supply line 206. The other end of the negative front line 202e is provided in the front connector 215. The other end of the negative rear line 202f is provided in the rear connector 216.

The positive common line 201g and the negative common line 202g each extends in the "y" direction and then in the "x" direction so as to be separated from the power source connector 211. The positive common line 201g and the negative common line 202g have the same length. The positive common line 201g and the negative common line 202g extend in the "x" direction and the "y" direction in a manner that these lines are arranged next to each other and run in parallel.

The positive front line 201e extends from the first branch point of the positive common line 201g toward the front connector 215. The positive rear line 201f extends from the first branch point toward the rear connector 216.

The negative front line 202e extends from the second branch point of the negative common line 202g toward the front connector 215. The negative rear line 202f extends from the second branch point toward the rear connector 216.

The positive front line 201e and the negative front line 202e have the same length. These two front lines extend in the "x" direction and the "y" direction in a manner that these lines are arranged next to each other and run in parallel.

The positive rear line 201f and the negative rear line 202f have the same length. These two rear lines extend in the "x" direction and the "y" direction in a manner that these lines are arranged next to each other and run in parallel.

<First Filter>

In addition to the electric devices described so far, the power distribution device 200 has the first filter 291. The first filters 291 are provided on the first power supply line 205 and the second power supply line 206, respectively. The first filters 291 have functions of reducing current noise such as ripples input from the front PCU 500 and the rear PCU 600.

A frequency band of a current noise is approximately 2 MHz. As an element having a current noise reducing function, for example, a ferrite core, a capacitor, or the like may be adopted. As the ferrite, for example, a spinel ferrite, a hexagonal crystal ferrite, a garnet ferrite, or the like may be adopted. These elements can be adopted as the first filter 291.

In the case that a ferrite core is adopted as the first filter 291, the first filter 291 may be provided on both two common lines so that the first filter 291 collectively surrounds both the positive common line 201g and the negative common line 202g running side by side. Therefore, although FIG. 2 illustrates that two first filters 291 are provided on two common lines, respectively, it is possible to adopt a configuration in which a single first filter 291 is provided commonly on both two common lines.

In the case that a capacitor is adopted as the first filter 291, one ends among two electrodes of the capacitors are connected to the positive common line 201g and the negative common line 202g, respectively. The other ones of the two electrodes of the capacitors provided to two common lines are connected to the ground. It is possible to adopt a configuration in which the other ones of the two electrodes of the capacitors are connected with common lines, and connected to the ground.

As simply shown in FIG. 2, the first filters 291 provided on a side to the other end among one end and the other end of the first power supply line 205 and the second power supply line 206, respectively. A total length from a part, where the first filer 291 is provided, to one end, which is provided in the power source connector 211 in those two power supply lines is a first length L1. A total length from a part, where the first filer 291 is provided, to one end, which is provided in the front connector 215 or the rear connector 216 in the two power supply lines is second length L2. The second distance L2 is shorter than the first distance L1 (L2<L1).

As described above, the first filter 291 is provided on a side to the other end of the power supply line, the first filter 291 is provided on the positive common line 201g and the negative common line 202g included one end of the power supply line, respectively. More specifically, the first filter 291 is provided on the other end sides (the branch point side) of each of the positive common line 201g and the negative common line 202g.

<Irregular-Shaped Portion>

As shown in FIG. 3, the bottom wall 271 of the housing 270 is formed with an irregular-shaped portion 277, which has a locally different shape as compared with other portions. The irregular-shaped portion 277 of the present embodiment has a thin portion 277a, which has a locally thinner thickness of the bottom wall 271, between the inner bottom surface 271a and the outer bottom surface 271b. The thin portion 277a has low rigidity.

The irregular-shaped portion 277 is formed between an inner side of the vehicle and the outside of the vehicle on the bottom wall 271. In the present embodiment, the irregular-shaped portion 277 is formed between the upright portion of the inner vertical wall 275 and the upright portion of the outer vertical wall 276 in the bottom wall 271.

A connector and a first device, which are used when the vehicle is running, are provided on a side to the inner vertical wall 275 than the irregular-shaped portion 277. A connector and a second device, which are used when the power is supplied from the external power source, are provided on a side to the outer vertical wall 276 than the irregular-shaped portion 277. In FIG. 3, the boundary line BL indicating the boundary of locations where those two kinds of the connectors and devices are arranged is shown by an alternate long and short dash line.

<Operation and Advantage>

As described above, the power source connector 211, the front connector 215, and the rear connector 216, which are used during running the vehicle, are provided on an inner side of the vehicle.

Therefore, it is possible to suppress an occurring of failures of the power source connector 211, the front connector 215, and the rear connector 216 caused by an external force application from an outside to an inside the vehicle. It is possible to suppress an occurring of failures of power supply from the battery pack 100 to the front PCU 500 and the rear PCU 600. As a result, it is possible to suppress an occurring of failures of power supply to the front MG 510 and the rear MG 610. It is possible to suppress that the vehicle becomes difficult to drive due to the external force.

Further, the first power supply line 205 and the second power supply line 206, which electrically connect a pair of the power source connector 211 and the front connector 215, and a pair of the power source connector 211 and the rear connector 216, are provided on an inner side of the vehicle.

Therefore, it is possible to suppress an occurring of failures on those supply lines due to the external force. It is possible to suppress that the vehicle becomes difficult to drive resulting from an occurring of failures of power supply to the front MG 510 and the rear MG 610.

As described above, three connectors including the power source connector 211, the front connector 215, and the rear connector 216, and the lines including the first power supply line 205 and the second power supply line 206, which connect these three connectors, are provided on an inner side of the vehicle Specifically in this embodiment, the power source connector 211, the front connector 215, and the rear connector 216 are provided on the inner vertical wall 275. These three connectors are arranged next to each other in the "x" direction. The first power supply line 205 and the second power supply line 206 are provided on a side to the inner vertical wall 275 in the "y" direction. According to this arrangement configuration, it is possible to reduce an increase in wiring length of each of the first power supply line 205 and the second power supply line 206.

The DCDC converter circuit 220, the fuses 240, and the power distribution ECU 260 included in the first device, which are used when the vehicle is running, are provided on an inner side of the vehicle.

Therefore, it is possible to suppress an occurring of failures on the first device due to the application of an external force to the vehicle. It is possible to suppress that the vehicle becomes difficult to drive resulting from an occurring of failures of power supply to the MG.

The first filters 291 are provided on the first power supply line 205 and the second power supply line 206, respectively. According to this, the current noise outputted from the front PCU 500 and the rear PCU 600 may be reduced.

As a matter of course, the current noise may not be reduced until entering into the first filter 291. The current noise may propagate electromagnetic noise while flowing from the other end side of each of the first power supply line 205 and the second power supply line 206 to a portion on which the first filter 291 is provided. The electromagnetic noise may be propagated to an inner cavity of the housing 270.

On the other hand, the first filter 291 is provided on a side to the other end of the first power supply line 205 or the second power supply line 206. Therefore, as compared with a configuration in which the first filter 291 is provided on a side to one end of these two feeding lines, a conducting distance of the current noise in the power supply line becomes shorter.

As described above, the first power supply line 205 has the positive front line 201*e*, the positive rear line 201*f*, and the positive common line 201*g* that is commonly connected to these two positive lines. The first filter 291 is provided on the positive common line 201*g*.

Similarly, the second power supply line 206 has the negative front line 202*e*, the negative rear line 202*f*, and the negative common line 202*g* that is commonly connected to these two negative lines. The first filter 291 is provided on the negative common line 202*g*.

In the case that a ferrite core is adopted as the first filter 291, one of the first filter 291 may be provided commonly on both the positive common line 201*g* and the negative common line 202*g* running side by side.

The irregular-shaped portion 277 is formed between the upright portion of the inner vertical wall 275 and the upright portion of the outer vertical wall 276 in the bottom wall 271. The connector and the first device, which are used when the vehicle is running, are provided on a side to the inner vertical wall 275 than the irregular-shaped portion 277. The connector and the second device, which are used when the power is supplied from the external power source, are provided on a side to the outer vertical wall 276 than the irregular-shaped portion 277.

According to this, stress concentration is likely to occur on the irregular-shaped portion 277 due to an application of an external force to the vehicle. Therefore, it is possible to suppress an occurring of stress concentration in a portion located on an inner side of the vehicle than the irregular-shaped portion 277 in the housing 270. It is possible to reduce damages to a portion located on an inner side of the vehicle. It is possible to suppress an occurring of failures of the connector and the first device, which are used when the vehicle is running and are located in the inner side of the vehicle in the housing 270. As a result, it is possible to suppress that the vehicle becomes difficult to drive due to an application of an external force.

In the present embodiment, the irregular-shaped portion 277 has the thin portion 277*a* having low rigidity. As a result of stress concentration in the thin portion 277*a*, the thin portion 277*a* is positively damaged. Therefore, it is possible to suppress an application of an external force on a portion located on an inner side of the vehicle than the irregular-shaped portion 277 in the housing 270.

Second Embodiment

Figure 4:
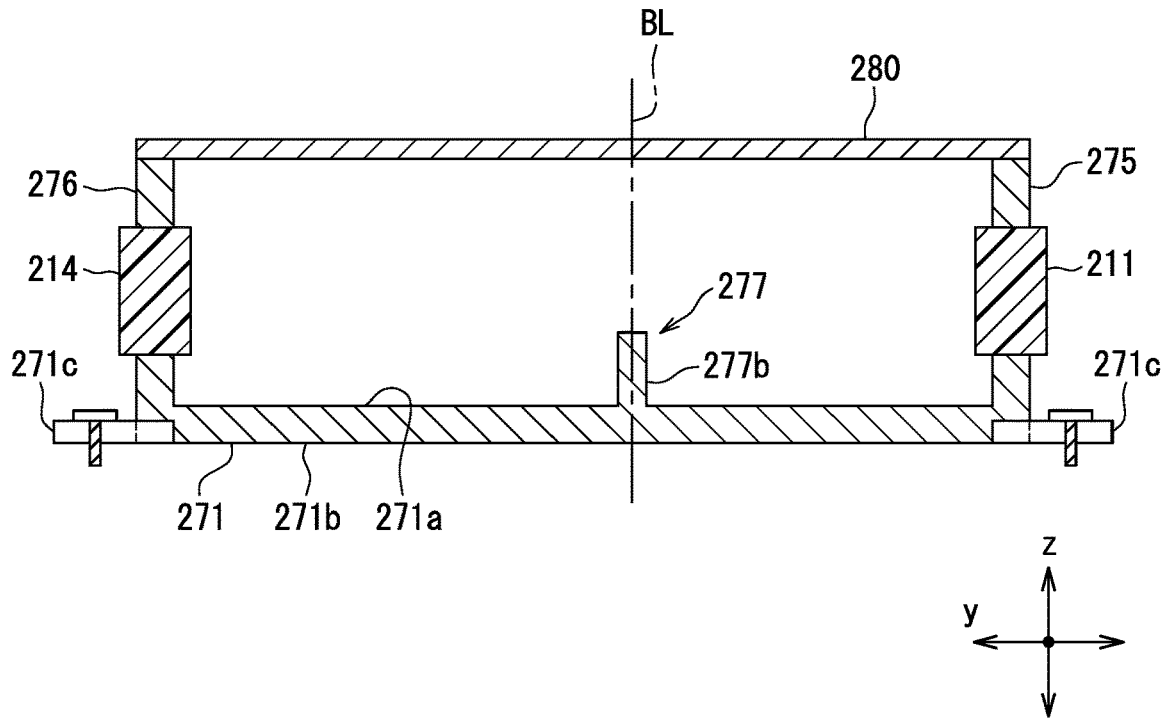
FIG. 4 is a cross-sectional view for explaining an irregular-shaped portion according to a second embodiment.

Next, a second embodiment is described with reference to FIG. 4.

In the first embodiment, an example, in which the irregular-shaped portion 277 has a thin portion 277*a* in which the thickness of the bottom wall 271 is locally thin, is shown. On the other hand, the irregular-shaped portion 277 of the present embodiment has a thick portion 277*b*, which has a locally thicker thickness of the bottom wall 271.

According to this, even if stress concentration occurs in the thick portion 277*b* due to the application of an external force to the vehicle, it is possible to suppress a damage of the thick portion 277*b*. Therefore, it is possible to suppress a deformation of a portion located on an inner side of the vehicle than the irregular-shaped portion 277 in the housing 270 caused by an external force.

The power distribution device 200 described in the present embodiment includes components equivalent to those of the power distribution device 200 described in the first embodiment. Therefore, the similar effect can be provided. This also applies to embodiments shown below. This description is omitted below.

Third Embodiment

Figure 5:
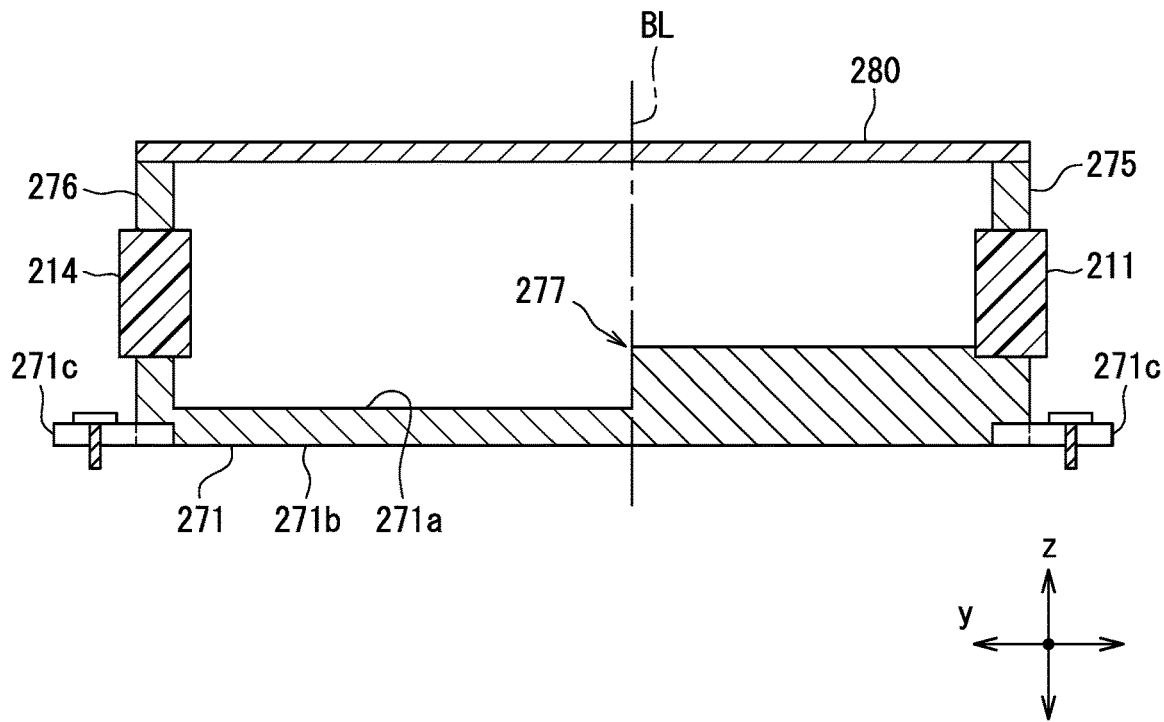
FIG. 5 is a cross-sectional view for explaining an irregular-shaped portion according to a third embodiment.

Next, a third embodiment is described with reference to FIG. 5.

In the first embodiment and the second embodiment, examples, in which the thickness of the bottom wall 271 is uniform except for the irregular-shaped portion 277, are shown. On the other hand, in the present embodiment, the bottom wall 271 has different thickness at an outside of the vehicle and at an inner side of the vehicle, so that a shape is locally differentiated at a boundary. The thickness of the bottom wall 271 is thicker on the inner side than that on the outer side of the vehicle. The irregular-shaped portion 277 of the present embodiment corresponds to the boundary, in which the thickness of the bottom wall 271 is differentiated.

According to this, even if stress concentration occurs at the boundary (irregular-shaped portion 277) of the parts having different thicknesses of the bottom wall 271 due to an application of an external force to the vehicle, it is possible to suppress an occurring of damages on the part of the bottom wall 271 located inner side the vehicle.

Fourth Embodiment

Figure 6:
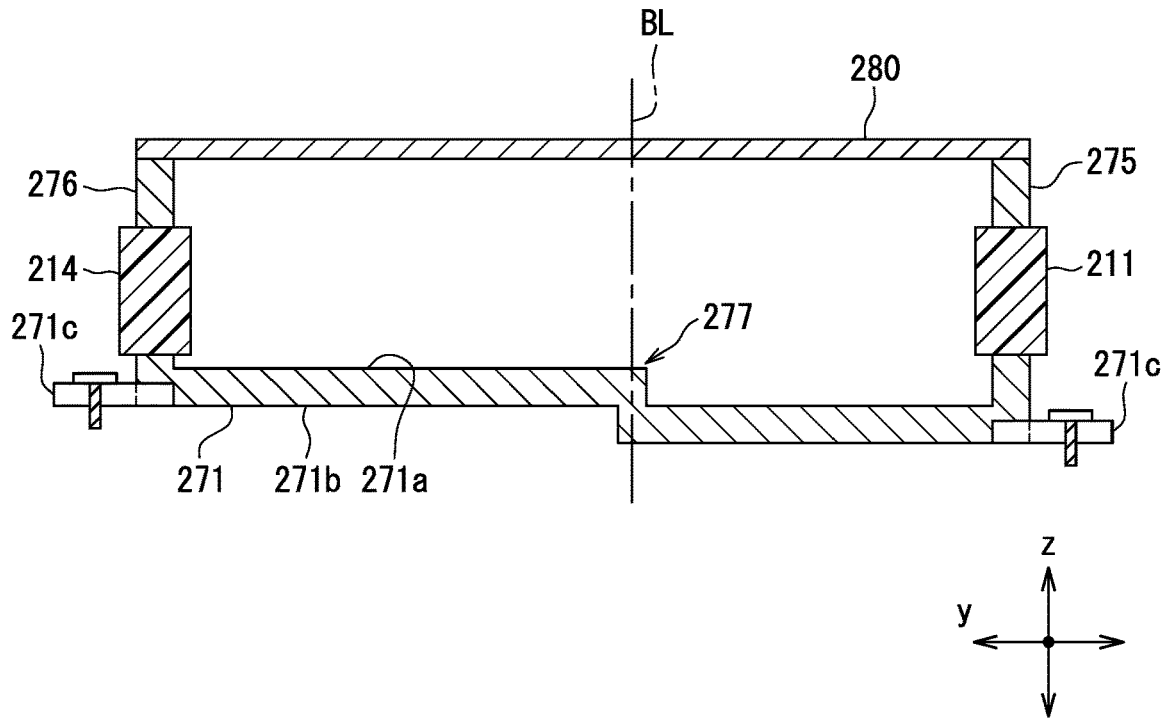
FIG. 6 is a cross-sectional view for explaining an irregular-shaped portion according to a fourth embodiment.

Next, a fourth embodiment is described with reference to FIG. 6.

In the third embodiment, an example, in which the thickness of the bottom wall 271 differs between the outside and the inner side of the vehicle, is shown. On the other hand, in the present embodiment, a step is created between two portions, in which a vehicle inner side portion of the bottom wall 271 and a vehicle outer side portion of the bottom wall 271 are different in locations in the "z" direction. The irregular-shaped portion 277 of the present embodiment corresponds to the portion, in which the step is formed on the bottom wall 271.

According to this, stress concentration is likely to occur on the step (irregular-shaped portion 277) of the bottom wall 271 due to an application of an external force to the vehicle. Therefore, it is possible to suppress an occurring of a stress concentration in a portion of the bottom wall 271 located on an inner side of the vehicle than the irregular-shaped portion 277.

Fifth Embodiment

Next, a fifth embodiment is described with reference to FIG. 7.

In the second embodiment, an example, in which the thick portion 277b is located on the boundary line BL, is shown. On the other hand, in the present embodiment, the thick portion 277b is located on a side to the outer vertical wall 276 in the "y" direction than the boundary line BL. The distance between the thick portion 277b and the outer vertical wall 276 in the "y" direction is longer than the length of the outer vertical wall 276 in the "z" direction.

Figure 7:
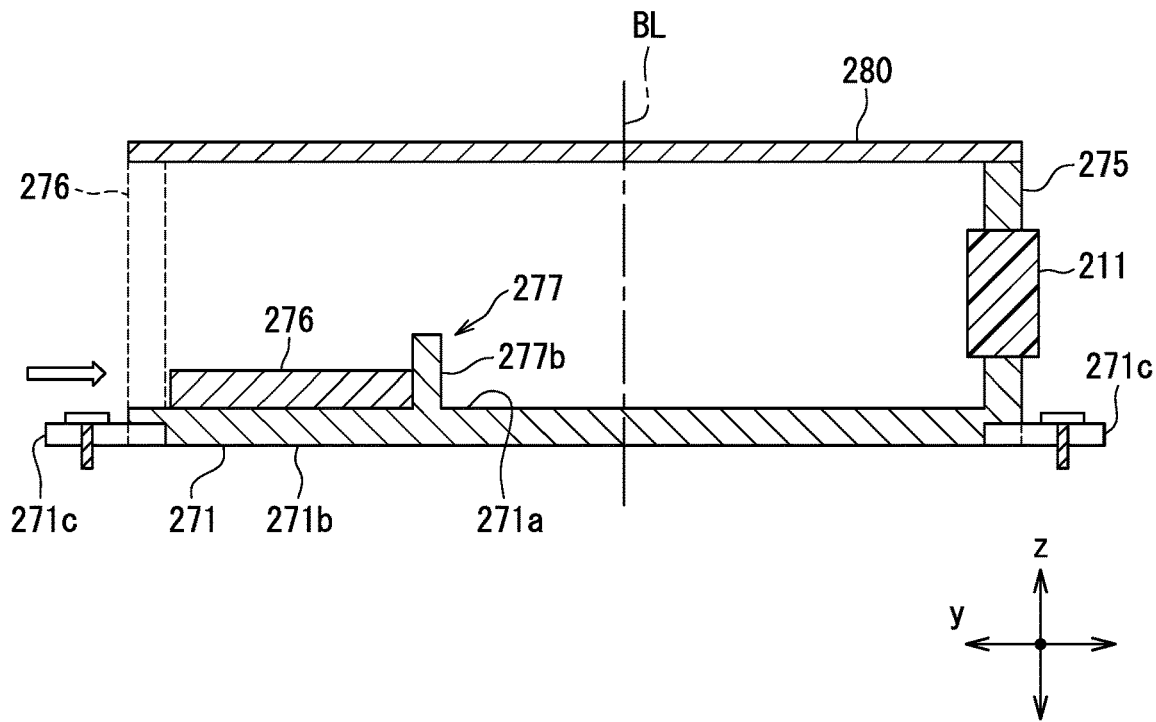
FIG. 7 is a cross-sectional view for explaining an irregular-shaped portion according to a fifth embodiment.

According to this, for example, a connection portion between the outer vertical wall 276 and the bottom wall 271 may be damaged by an application of an external force to the vehicle indicated by a white arrow symbol in FIG. 7. The outer vertical wall 276 may fall down inside to a storage space side of the housing 270. A distal end of the outer vertical wall 276 may easily come into contact with the thick portion 277b. As a result, a displacement of the damaged outer vertical wall 276 moving into an inner side of the vehicle of the housing 270 may be suppressed. It is possible to suppress a collision of the outer vertical wall 276 to the connector and the first device, which are used when the vehicle is running and are located in the inner side of the vehicle in the housing 270.

(First Modification)

In the above embodiments, examples, in which the power source connector 211, the front connector 215, and the rear connector 216 are provided on the inner vertical wall 275, are shown. An example, in which the DC power connector 214 and the AC power connector 217 are provided on the outer vertical wall 276, is shown.

It is preferable that the power source connector 211, the front connector 215, and the rear connector 216 are provided on an inner side of the vehicle than the DC power connector 214 and the AC power connector 217, respectively. An arrangement of the connectors is not limited by the above described example.

Figure 8:
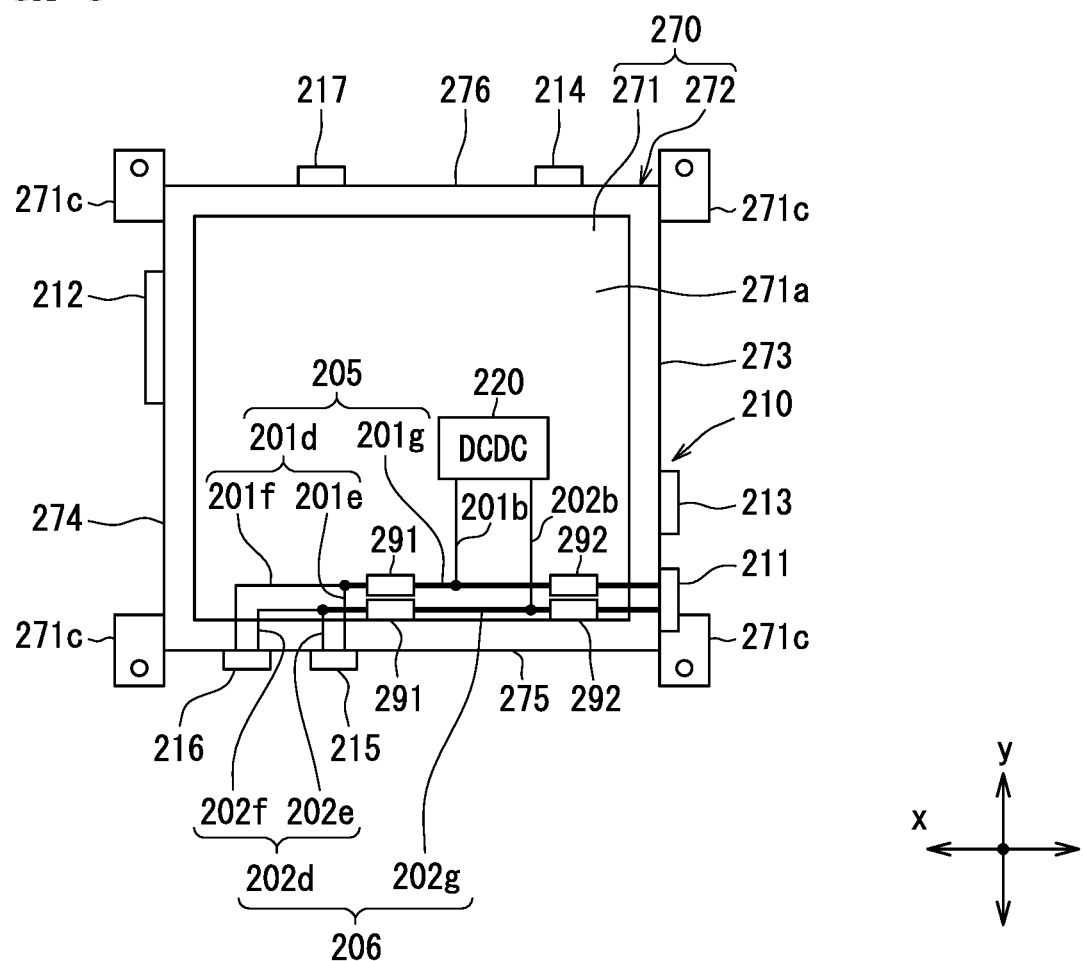
FIG. 8 is a schematic view for explaining a power distribution device according to a modified example.
Figure 9:
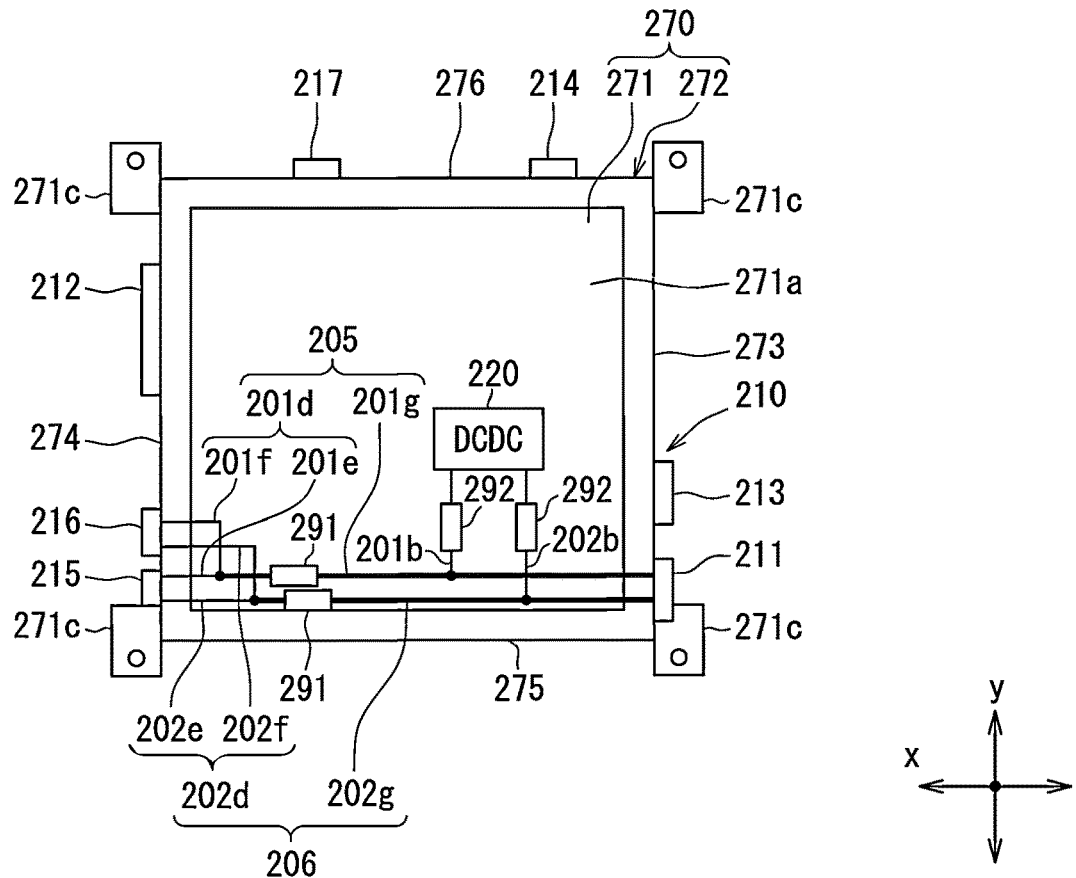
FIG. 9 is a schematic view for explaining a power distribution device according to a modified example.

In the case that the DC power connector 214 and the AC power connector 217 are provided on the outer vertical wall 276, for example, the configurations shown in FIGS. 8 and 9 may be adopted. In this modification, the power source connector 211 is provided on a side to the inner vertical wall 275 of the inner horizontal wall 273. In this modification shown in FIG. 9, the front connector 215 and the rear connector 216 are provided on a side to the inner vertical wall 275 of the outer horizontal wall 274.

Although not shown anymore, for example, in the case that the DC power connector 214 and the AC power connector 217 are provided on the outer horizontal wall 274, a configuration in which the power source connector 211, the front connector 215, and the rear connector 216 are provided on a side to the inner horizontal wall 273 may be adopted.

(Second Modification)

In the above embodiments, examples, in which the first filters 291 are provided on sides of the other ends of the positive common line 201g and the negative common line 202g, respectively, are shown. On the other hand, for example, as shown in FIG. 8, a configuration in which a new second filter 292 is provided on one end side of each of the positive common line 201g and the negative common line 202g may be adopted.

The second positive line 201b is connected to an intermediate point between a portion where the first filter 291 is arranged and a portion where the second filter 292 is arranged on the positive common line 201g. The second negative line 202b is connected to an intermediate point between a portion where the first filter 291 is arranged and a portion where the second filter 292 is arranged on the negative common line 202g. As described above, the DCDC converter circuit 220 is provided on the second positive line 201b and the second negative line 202b.

The second filter 292 has a function of reducing current noise input from the DCDC converter circuit 220. This current noise is mainly caused by switching of the switch elements included in the DCDC converter circuit 220, and its frequency band is about 1 MHz. As described above, the frequency band of the current noise to be reduced is different between the second filter 292 and the first filter 291. As an element having a current noise reducing function, for example, a ferrite core, a capacitor, or the like may be adopted.

According to the above mentioned configuration, it is possible to suppress current noise flow through the positive common line 201g and the negative common line 202g. The current noise includes a current noise entering from the front PCU 500 and the rear PCU 600, and a current noise outputted from the DCDC converter circuit 220. The current noise outputted from the front PCU 500 and the rear PCU 600 is suppressed from entering into the DCDC converter circuit 220.

(Third Modification)

As shown in FIG. 9, a configuration in which a second filters 292 are provided on the second positive line 201b and the second negative line 202b, respectively. In this modification, the second positive line 201b is connected to an intermediate point between a portion where the first filter 291 is arranged and a portion where the power source connector 211 is arranged on the positive common line 201g. The second negative line 202b is connected to an intermediate point between a portion where the first filter 291 is arranged and a portion where the power source connector 211 is arranged on the negative common line 202g.

According to this configuration, it is possible to reduce entering of a current noise output from the DCDC converter circuit 220 into the front PCU 500 and the rear PCU 600. Contrary, it is possible to reduce entering of the current noise output from the front PCU 500 and the rear PCU 600 into the DCDC converter circuit 220.

(Fourth Modification)

In the above embodiments, examples, in which the irregular-shaped portion 277 has one of the thin portion 277a and the thick portion 277b, are shown. However, it is also possible to adopt a configuration in which the irregular-shaped portion 277 has both the thin portion 277a and the thick portion 277b.

The shape of the thin portion 277a is not limited to the shape in which the inner bottom surface 271a is locally recessed toward the outer bottom surface 271b as shown in FIG. 3, for example. For example, the thin portion 277a may have a shape in which the outer bottom surface 271b is locally recessed toward the inner bottom surface 271a. The thin portion 277a may have a shape in which the inner bottom surface 271a is locally recessed toward the outer bottom surface 271b and the outer bottom surface 271b is recessed toward the inner bottom surface 271a.

The cross-sectional shape of the thin portion 277a does not have to be rectangular, for example, as shown in FIG. 3. The cross-sectional shape of the thin portion 277a may be, for example, a semicircle, a triangle, or a combination of these various shapes.

(Fifth Modification)

In the above embodiments, examples, in which the irregular-shaped portion 277 is located between a group of the power source connector 211, the front connector 215, and the rear connector 216, which are used when the vehicle is running, and a group of the DC power connector 214 and the AC power connector 217, which are used when a power is supplied from the external power source, are shown.

However, for example, the irregular-shaped portion 277 may be located between the power source connector 211 and the DC power connector 214 and the AC power connector 217. The irregular-shaped portion 277 may be located between a group of the front connector 215 and the rear connector 216, and a group of the DC power connector 214 and the AC power connector 217.

(Other Modifications)

In the present embodiment, an example, in which the vehicle is provided with both the front MG 510 and the rear MG 610, is shown. However, it is also possible to adopt a configuration in which the system is provided with only one of MG among the front MG 510 and the rear MG 610. When only one of these two MGs is provided in the system, the system is provided with only one MG of the front MG 510 or the rear MG 610.

Although the present disclosure has been described in accordance with examples, it is understood that the present disclosure is not limited to the examples and configurations. The present disclosure is intended to cover various modification and equivalent arrangements. In addition, while the various elements are shown in various combinations and configurations, which are exemplary, other combinations and configurations, including more, less or only a single element, are also within the spirit and scope of the present disclosure.

What is claimed is:

1. A power distribution device, comprising:
an external power connector which is capable of being connected to an external power source;
an internal power connector which is capable of being connected to a vehicle- mounted power source;
a power connector which is capable of being connected to a vehicle-mounted power converter circuit supplying power to a vehicle-mounted electrical device; and
a housing which accommodates a power transformer circuit, the external power connector, the internal power connector, and the power connector, wherein
the internal power connector and the power connector are provided farther inside a vehicle than the external power connector,
an irregular-shaped portion, which has a locally different shape, is formed at a location (i) between the external power connector and the internal power connector in the housing or (ii) between the external power connector and the power connector, and
the irregular-shaped portion is configured to create stress concentration at the location and thereby reduce damage at a portion in the housing located farther inside the vehicle than the location of the irregular-shaped portion.

2. The power distribution device according to claim 1, wherein
the vehicle-mounted electrical device is a motor which outputs propulsive force to the vehicle.

3. The power distribution device according to claim 1, wherein
the irregular-shaped portion has (i) a thin portion, which is locally thinner, or (ii) a thick portion, which is locally thicker.

4. The power distribution device according to claim 1, wherein
the housing accommodates a switch element and a control unit in addition to the external power connector, the internal power connector, the power transformer circuit, and the power connector.

* * * * *